(12) United States Patent
Eguchi

(10) Patent No.: US 9,208,952 B2
(45) Date of Patent: Dec. 8, 2015

(54) ELECTRIC DOUBLE LAYER CAPACITOR MATERIAL

(75) Inventor: Haruki Eguchi, Tokyo (JP)

(73) Assignee: IHI Corporation, Tokyo (JP)

( * ) Notice: Subject to any disclaimer, the term of this patent is extended or adjusted under 35 U.S.C. 154(b) by 82 days.

(21) Appl. No.: 14/131,940

(22) PCT Filed: Apr. 20, 2012

(86) PCT No.: PCT/JP2012/060708
§ 371 (c)(1),
(2), (4) Date: Apr. 23, 2014

(87) PCT Pub. No.: WO2013/008510
PCT Pub. Date: Jan. 17, 2013

(65) Prior Publication Data
US 2014/0235883 A1    Aug. 21, 2014

(30) Foreign Application Priority Data

Jul. 11, 2011 (JP) ................................. 2011-153175

(51) Int. Cl.
*H01G 9/00* (2006.01)
*H01G 9/15* (2006.01)
*H01G 11/56* (2013.01)

(52) U.S. Cl.
CPC ............... *H01G 9/0003* (2013.01); *H01G 9/15* (2013.01); *H01G 11/56* (2013.01); *H01G 2009/0007* (2013.01); *Y02E 60/13* (2013.01)

(58) Field of Classification Search
CPC .................. H01G 9/0003; H01G 9/15; H01G 2009/0007; H01G 11/56
USPC ........................................................... 556/32
See application file for complete search history.

(56) References Cited

U.S. PATENT DOCUMENTS

| 2004/0057191 A1 | 3/2004 | Timonov et al. |
| 2007/0065719 A1 | 3/2007 | Timonov et al. |
| 2012/0029167 A1 | 2/2012 | Ishikawa et al. |

FOREIGN PATENT DOCUMENTS

| EP | 1678728 A | 7/2006 |
| EP | 2357166 A1 | 8/2011 |
| JP | 2007-508709 A | 4/2007 |
| WO | 2005-036572 A1 | 4/2005 |
| WO | 2010058280 A1 | 5/2010 |

OTHER PUBLICATIONS

International Search Report issued in corresponding application No. PCT/JP2012/060708 on Jul. 17, 2012. International Publication issued in corresponding application No. PCT/JP2012/060708 on Jan. 17, 2013. Written Opinion issued in corresponding application No. PCT/JP2012/060708 on Jul. 17, 2012.
Foreign Office Action dated Apr. 2, 2015.

*Primary Examiner* — Porfirio Nazario Gonzalez
(74) *Attorney, Agent, or Firm* — Brundidge & Stanger, P.C.

(57) ABSTRACT

A material for constituting an electric double layer capacity that is stable at high temperatures and can expect a high electric capacity is provided. Such a material is an electric double layer capacitor material which is used as a material for constituting solid electrolytes 13 and 17 for an electric double layer capacitor 1 and is composed of a metal-salen complex compound.

3 Claims, 5 Drawing Sheets

(1)

(2)

(APPEARANCE OF CAPACITOR ELEMENT)

ELECTRIC DOUBLE LAYER CAPACITOR MATERIAL

TECHNICAL FIELD

The present invention relates to a material for constituting an electric double layer capacitor having a laminated structure of an electrolyte and internal electrodes.

BACKGROUND ART

An electric double layer capacitor is configured by stacking a positive electrode and a negative electrode, which are polarized electrodes, and a separator which separates these electrodes, in alternating layers within an outer case and impregnating them with an electrolytic solution (such as an electrolyte dissolved in a solution or an ionic liquid); and the electric double layer capacitor is a next-generation storage battery that utilizes an electrostatic capacity of electric double layers formed on surfaces of the polarized electrodes in the electrolytic solution.

An electric double layer capacitor which is currently generally used is one which has polarized electrodes composed by mainly using activated carbon and uses an electrolytic solution containing an organic solvent such as propylene carbonate (PC) as its main component. Such an electric double layer capacitor is characterized in that it can obtain an extremely larger electrostatic capacity than that of a general capacitor such as an aluminum capacitor; and the electric double layer capacitor has been being used for a wide variety of use applications, for example, for back-up of electronic equipment such as mobile phones and digital cameras, electric power storage for electrical household appliances and copy machines, starting power sources at the time of idle stop of automobiles, power sources for hybrid vehicles, and electric power storage for peak shaving and leveling of wind power and photovoltaic power generation; and the electric double layer capacitor is expected as a key device that is useful for energy saving and reduction of carbon dioxide gas.

Moreover, a cylindrical PAS (Poly Acenic Semi-conductor: polyacene organic semiconductor) capacitor which uses a solid electrolyte using polyacene has been introduced as an electric double layer capacitor. This cylindrical PAS capacitor is configured so that PAS electrodes formed on aluminum foils are rolled; and its electrodes and solid electrolyte are required to be flexible.

Furthermore, examples of an organic film capacitor in which a filmy derivative and filmy internal electrodes are stacked in alternate layers include a polystyrene capacitor, a polyester capacitor (Mylar capacitor), a polypropylene capacitor, a Teflon (registered trademark) capacitor, and a polyphenylene sulfide capacitor.

The polystyrene capacitor contains styrol resin, which is popular plastic used for, for example, CD cases, as its main component, can be easily molded, is inexpensive, and has various excellent properties, while its heat-resistant temperature is 85 degrees Celsius, it is weak against heat, and its mechanical strength is insufficient. In recent years, materials which have improved the above-described defect by controlling molecular arrangement of styrol resin and causing crystallization have also been used. Moreover, the polyester capacitor (Mylar capacitor) is characterized in that it has various excellent properties, but its dielectric absorption is slightly large. Furthermore, the polypropylene capacitor is characterized in that it has various excellent properties and has high pressure resistance (approximately 1000 V). Furthermore, the Teflon (registered trademark) capacitor is characterized in that it can resist relatively high temperatures although it is a plastic film condenser; and the polyphenylene sulfide capacitor is characterized in that it has various good properties and excellent heat resistance.

An electric double layer capacitor which uses a nickel-salen complex for electrodes has also been introduced (for example, see Patent Literature 1).

CITATION LIST

Patent Literature

[Patent Literature 1] U.S. No. 2004/57191A

SUMMARY OF INVENTION

Problems to be Solved by the Invention

However, regarding all the above-mentioned polystyrene capacitor, polyester capacitor, polypropylene capacitor, Teflon (registered trademark) capacitor, and polyphenylene sulfide capacitor, their materials for constituting electrodes break down at a temperature of approximately 100 degrees Celsius and their electric capacity is not sufficient, so that issues to be examined still remain.

Furthermore, the electric double layer capacitor described in Patent Literature 1 uses the nickel-salen complex for electrodes; however, the salen complex has properties as an insulator, so that it is not suited as a material for constituting electrodes for the electric double layer capacitor. Moreover, Patent Literature 1 does not refer to the use of the salen complex as a material for constituting a solid electrolyte for the electric double layer capacitor.

The present invention was devised in light of the above-described circumstances and it is an object of the invention to provide a material for constituting an electric double layer capacity that is stable at high temperatures and can expect a high electric capacity.

Means for Solving the Problems

In order to achieve this object, the present invention provides an electric double layer capacitor material composed of a metal-salen complex compound used as a material for forming a solid electrolyte for an electric double layer capacitor.

The metal-salen complex compound can be self-magnetic. Moreover, this metal-salen complex compound can use a compound expressed by the following Formula (I),

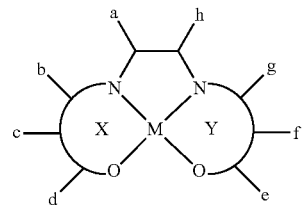

Formula (I)

wherein each of X and Y is a five-membered ring structure including a coordinate bond between N and M, or its six-membered ring structure;

wherein M represents a bivalent metallic element composed of Fe, Cr, Mn, Co, Ni, Mo, Ru, Rh, Pd, W, Re, Os, Ir, Pt, Nd, Sm, Eu, or Gd; and wherein if both X and Y are the five-membered ring structure, b and g do not exist and Formula (I) is any one of (i) to (iv):

(i) each of a to h is hydrogen or any one of the following (A) to (G) and —C(=O)m (where m is hydrogen or any one of the following (A) to (G));

(ii) each of (c, d) and (f, e) forms part of a heterocyclic structure and constitutes a condensate of the compound expressed by Formula (I) and the heterocyclic structure, each of a, b, g, and h is hydrogen or any one of the following (A) to (G) and —C(=O)m (where m is hydrogen or any one of the following (A) to (G)), the heterocyclic structure is any one of three-membered to seven-membered ring structures containing furan, theophene, pyrrole, pyrrolidine, pyrazole, pyrazolone, imidazole, 2-isoimidazole, oxazole, isoxazole, thiazole, imidazole, imidazolidine, oxazoline, oxazolidine, 1,2-pyran, thiazine, pyridine, pyridazine, pyrimidine, pyrazine, orthoxadine, oxazine, piperidine, piperazine, triazine, dioxane, and morpholine, and a side chain for the heterocyclic structure is halogen, —R, —O—R (where R is one functional group selected from a hydrocarbon group including a methyl group), or hydrogen;

(iii) each of (c, d) and (f, e) forms part of one condensed ring structure containing benzene or naphthalene and anthracene and forms a condensate of the compound expressed by Formula (I) and the condensed ring structure, each of a, b, g, and h is hydrogen or any one of the following (A) to (G), and a side chain for the condensed ring structure is halogen, R—O—: (where R is one functional group selected from a hydrocarbon group including a methyl group), or hydrogen;

(iv) each of a and h forms part of a cyclic hydrocarbon structure containing a compound mentioned below and forms a condensate of the compound expressed by Formula (I) and the cyclic hydrocarbon structure

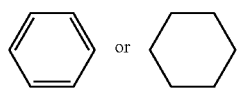

and a side chain for each of b to g and the cyclic hydrocarbon structure is hydrogen.

Furthermore, a compound expressed by Formula (II) below (hereinafter referred to as the "metal-salen complex compound (II)") can be used as the compound expressed by Formula (I).

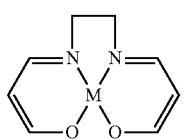

Formula (II)

Furthermore, a compound expressed by Formula (III) below (hereinafter referred to as the "metal-salen complex compound (III)") can be used as the compound expressed by Formula (I).

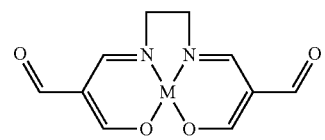

Formula (III)

Furthermore, a compound expressed by Formula (IV) below (hereinafter referred to as the "metal-salen complex compound (IV)") can be used as the compound expressed by Formula (I).

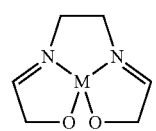

Formula (IV)

Furthermore, a compound expressed by Formula (V) below (hereinafter referred to as the "metal-salen complex compound (V)") can be used as the compound expressed by Formula (I).

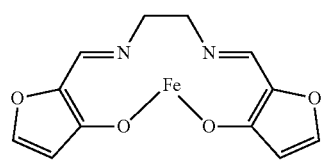

Formula (V)

Furthermore, a compound expressed by Formula (VI) or Formula (VII) below (hereinafter referred to as the "metal-salen complex compound (VI)" or "the metal-salen complex compound (VII)") can be used as the compound expressed by Formula (I).

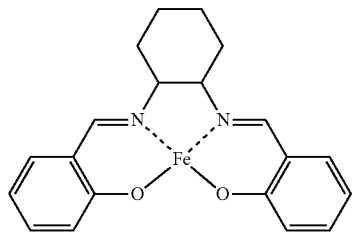

Formula (VI)

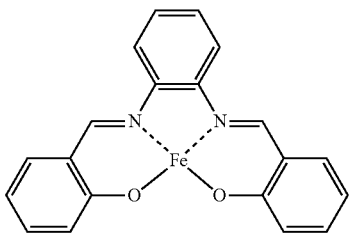

Formula (VII)

Furthermore, a compound expressed by Formula (VIII) or Formula (IX) below (hereinafter referred to as the "metal-salen complex compound (VIII)" or "the metal-salen complex compound (XI)") can be used as the compound expressed by Formula (I).

Formula (VIII)

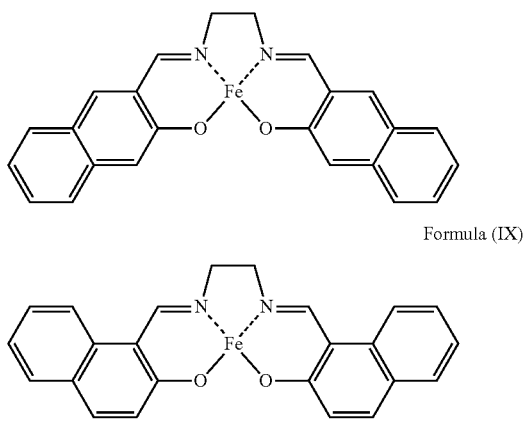

Formula (IX)

Furthermore, a compound expressed by Formula (X) or Formula (XI) below (hereinafter referred to as the "metal-salen complex compound (X)" or "the metal-salen complex compound (XI)") can be used as the compound expressed by Formula (I).

Formula (X)

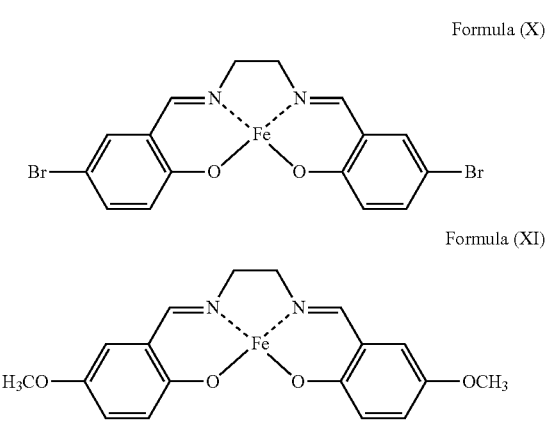

Formula (XI)

Furthermore, a compound expressed by Formula (XII) below (hereinafter referred to as the "metal-salen complex compound (XII)") can be used as the metal-salen complex compound, Formula (XII)

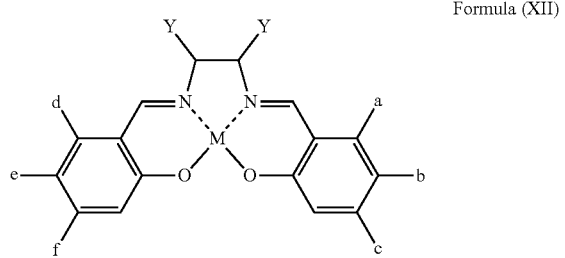

where M represents Fe, Cr, Mn, Co, Ni, Mo, Ru, Rh, Pd, W, Re, Os, Ir, Pt, Nd, Sm, Eu, or Gd and each of a to f and Y is hydrogen (if M is Fe, a case where all of a to f and Y are hydrogens is excluded).

Furthermore, a compound expressed by Formula (XIII) below (hereinafter referred to as the "metal-salen complex compound (XIII)") can be used as the metal-salen complex compound, Formula (XIII)

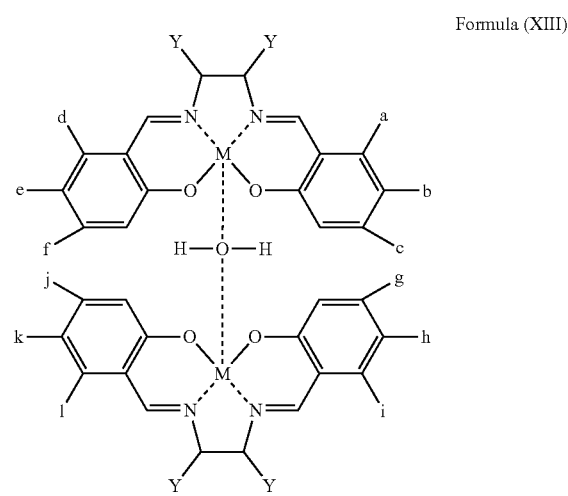

where M represents Fe, Cr, Mn, Co, Ni, Mo, Ru, Rh, Pd, W, Re, Os, Ir, Pt, Nd, Sm, Eu, or Gd and each of a to f and Y is hydrogen (if M is Fe, a case where all of a to f and Y are hydrogens is excluded).

Furthermore, a compound expressed by Formula (XIV) below (hereinafter referred to as the "metal-salen complex compound (XIV)") can be used as the metal-salen complex compound, Formula (XIV)

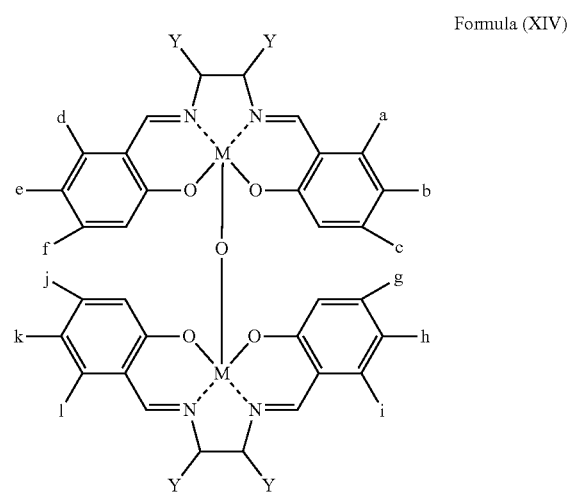

where M represents Fe, Cr, Mn, Co, Ni, Mo, Ru, Rh, Pd, W, Re, Os, Ir, Pt, Nd, Sm, Eu, or Gd and each of a to f and Y is hydrogen (if M is Fe, a case where all of a to f and Y are hydrogens is excluded).

Advantageous Effects of Invention

According to the present invention, it is possible to provide a material for constituting an electric double layer capacity that is stable at high temperatures, can secure sufficient safety, and has a high electric capacity.

BRIEF DESCRIPTION OF DRAWINGS

FIG. 5(2) is a photograph showing a sealing face of the electric double layer capacitor element shown in FIG. 5(1).

DESCRIPTION OF EMBODIMENTS

Next, a material for constituting an electric double layer capacitor according to an embodiment of the present invention will be explained with reference to drawings. Incidentally, embodiments described below are examples given for the purpose of describing this invention, and it is not intended to limit the invention only to these embodiments. Accordingly, this invention can be utilized in various ways unless the utilizations depart from the gist of the invention.

EXAMPLE 1

Figure 1:
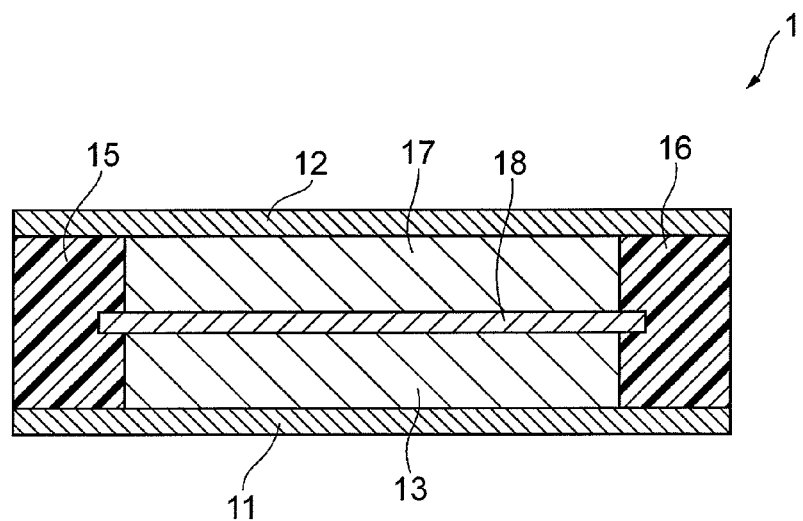
FIG. 1 is a schematic sectional view of an electric double layer capacitor which uses an electrode material according to an embodiment of the present invention.
Figure 2:
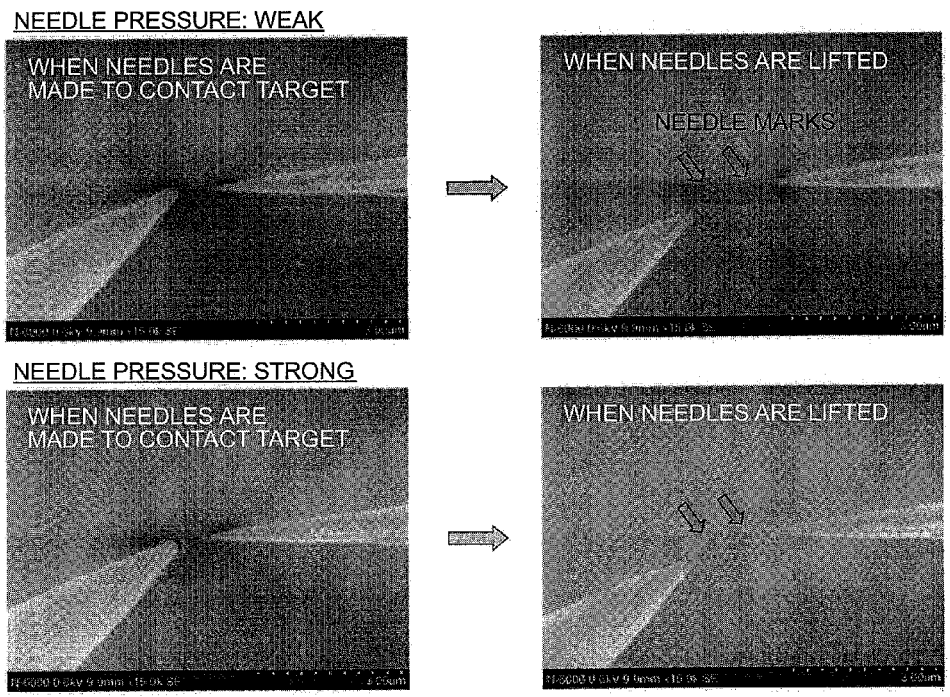
FIG. 2 shows SEM photographs taken when current-voltage characteristics of a substrate surface according to an embodiment of the present invention were measured.
Figure 3:
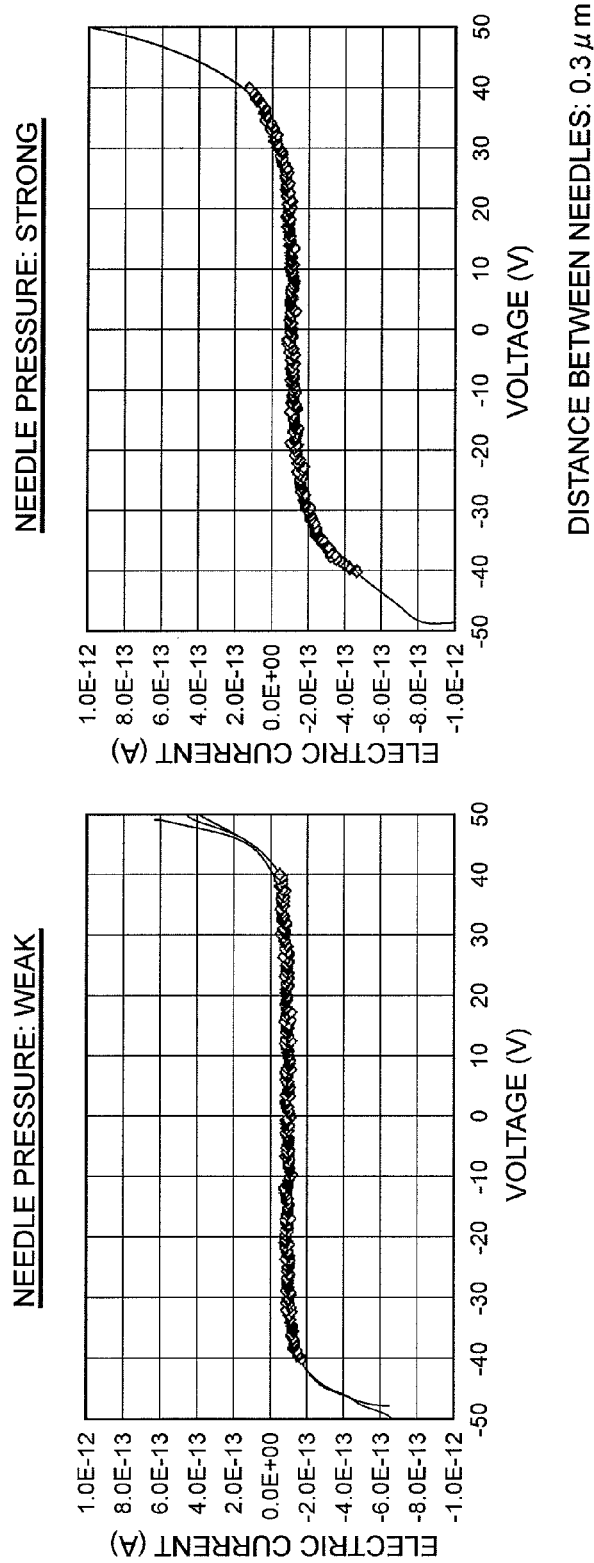
FIG. 3 illustrates current-voltage characteristics of the substrate surface according to an embodiment of the present invention.
Figure 4:
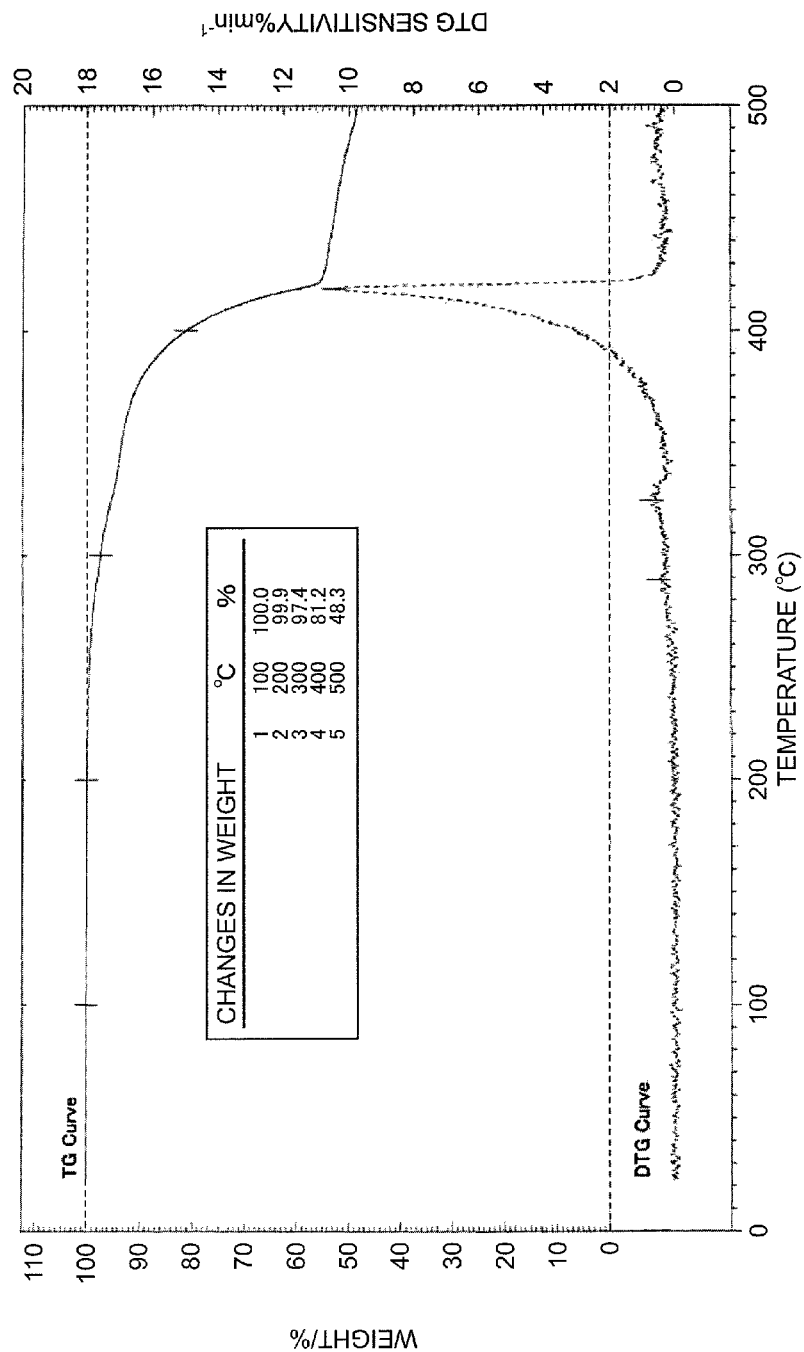
FIG. 4 illustrates the results of TG-mass analysis of an iron-salen complex compound according to an embodiment of the present invention.

FIG. 1 is a schematic sectional view of an electric double layer capacitor which uses an electrode material according to an embodiment of the present invention; FIG. 2 shows SEM photographs taken when current-voltage characteristics of a substrate surface according to an embodiment of the present invention were measured; FIG. 3 illustrates current-voltage characteristics of the above-described substrate surface; and FIG. 4 illustrates the results of TG-mass analysis of an iron-salen complex compound according to an embodiment of the present invention. However, FIG. 1 is a schematic illustration and, for example, the relationship between thickness and flat dimension and thickness proportions of respective layers are different from actual values. Therefore, specific thickness and dimensions should be judged in light of the following explanation. Furthermore, it is a matter of course that the diagrams include parts regarding which the relationship of dimensions and proportions are different from each other.

An electric double layer capacitor 1 according to this embodiment includes, as shown in FIG. 1: a separator 18; solid electrolytes 13 and 17 respectively located on both sides of the separator 18; an electrode (collector) 11 located on one side of the solid electrolyte 13 opposite the separator 18; an electrode (collector) 12 located on one side of the solid electrolyte 17 opposite the separator 18; and gaskets 15 and 16 located between the electrode 11 and the electrode 12 and at both ends of the separator 18 and the solid electrolytes 13 and 17. Incidentally, in this embodiment, electric capacity is enhanced and heat stability is maintained by using an iron-salen complex compound as a material for constituting the solid electrolytes 13 and 17. Moreover, a gold film was used as a material for constituting the electrodes 11 and 12.

<Method for Synthesizing Iron-Salen Complex Compound>

The iron-salen complex which is a material for constituting the solid electrolytes 13 and 17 according to this embodiment was produced by the following method.

Step 1:

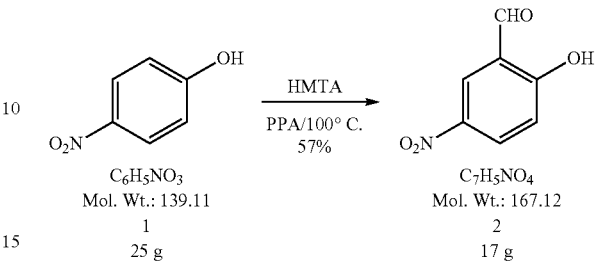

$C_6H_5NO_3$
Mol. Wt.: 139.11
1
25 g $C_7H_5NO_4$
Mol. Wt.: 167.12
2
17 g

A mixture of 4-nitrophenol (25 g, 0.18 mol), hexamethylene tetramine (25 g, 0.18 mol), and polyphosphoric acid (200 ml) were stirred for one hour at a temperature of 100 degrees Celsius. Then, that mixture was introduced to 500 ml of ethyl acetate and 1 L of water and stirred until it completely dissolved. Furthermore, when 400 ml of ethyl acetate was added to that solution, the solution separated into two phases. Subsequently, the aqueous phase was removed from the solution which separated into the two phases; and the remaining compound was washed twice with a basic solvent and dried over anhydrous $MgSO_4$. As a result, 17 g of Compound 2 (57% yield) was synthesized.

Step 2:

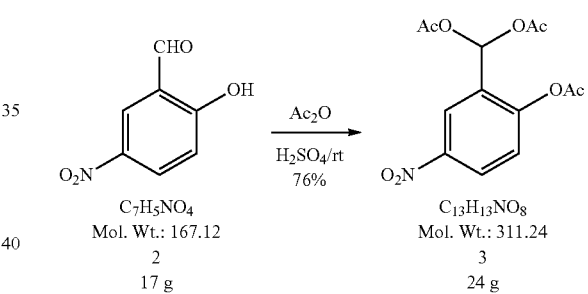

$C_7H_5NO_4$
Mol. Wt.: 167.12
2
17 g $C_{13}H_{13}NO_8$
Mol. Wt.: 311.24
3
24 g

Compound 2 (17 g, 0.10 mol), acetic anhydride (200 ml) and $H_2SO_4$ (minimal) were stirred for one hour at room temperature. The resulting solution was mixed for 0.5 hour in iced water (2 L) to bring about hydrolysis. The resulting solution was filtered and dried in air, thereby obtaining white powder. The powder was recrystallized, using a solvent containing ethyl acetate. As a result, 24 g of Compound 3 (76% yield) was obtained in the form of white crystals.

Step 3:

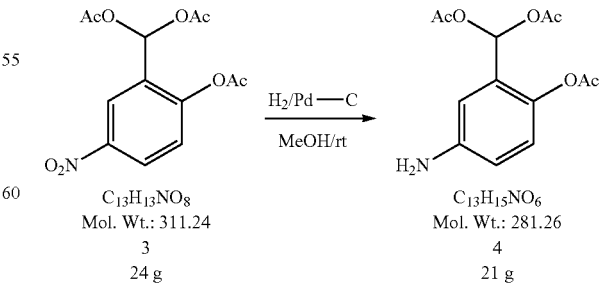

$C_{13}H_{13}NO_8$
Mol. Wt.: 311.24
3
24 g $C_{13}H_{15}NO_6$
Mol. Wt.: 281.26
4
21 g

A mixture of carbon (2.4 g) supporting 10% palladium with Compound 3 (24 g, 77 mmol) and methanol (500 ml) was reduced over night in a 1.5 atm hydrogen reducing atmosphere. After the reduction was completed, the product was filtered, thereby allowing 21 g of Compound 4 in the form of brown oil to be synthesized.

Steps 4 and 5:

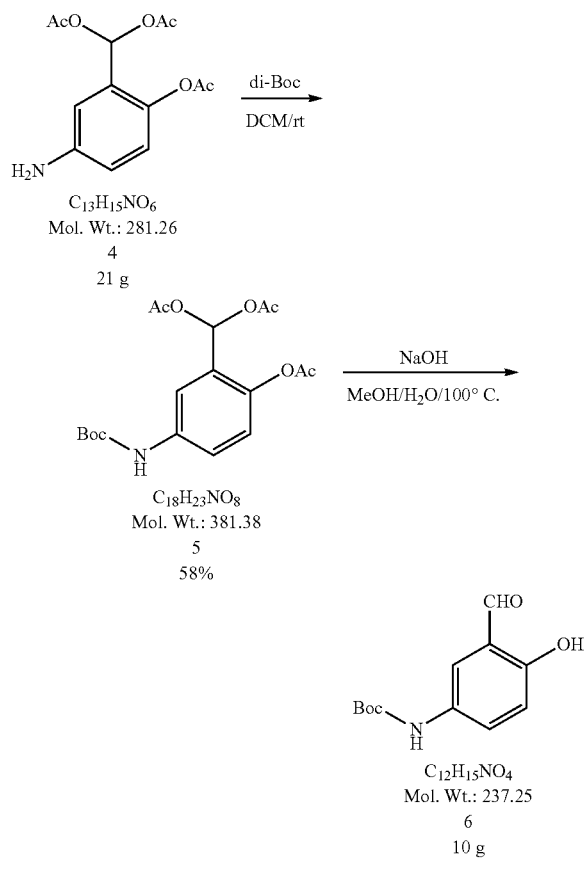

Compound 4 (21 g, 75 mmol) and di(tert-butyl)dicarbonate (18 g, 82 mmol) were stirred over night in anhydrous dichloromethane (DCM) (200 ml) in a nitrogen atmosphere. The resulting solution was allowed to evaporate in a vacuum and then dissolved in methanol (100 ml). Sodium hydroxide (15 g, 374 mmol) and water (50 ml) were then added and the solution was brought to reflux for 5 hours. The solution was then cooled, filtered, washed with water, and allowed to dry in a vacuum, thereby obtaining a brown compound. The resulting compound was processed twice by flash chromatography using silica gel, thereby obtaining 10 g of Compound 6 (58% yield).

Step 6:

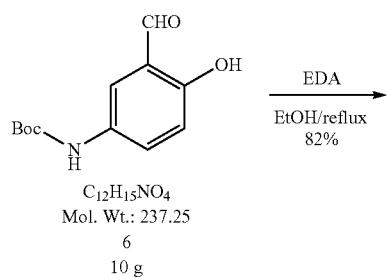

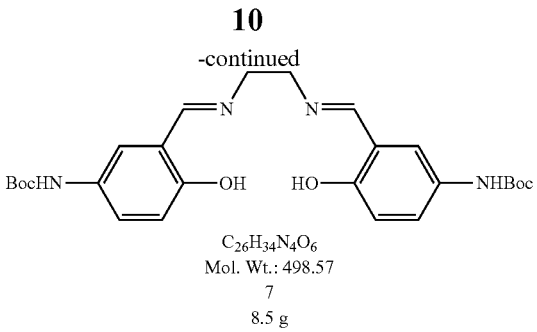

Compound 6 (10 g, 42 mmol) was introduced into 400 ml of anhydrous ethanol, the mixture was brought to reflux while heated, and several drops of ethylene diamine (1.3 g, 21 mmol) were added into 20 ml of anhydrous ethanol while stirred for 0.5 hour. The mixture was introduced into a container of ice, where it was cooled and mixed for 15 minutes. It was then washed with 200 ml of ethanol, filtered, and dried in a vacuum, thereby obtaining 8.5 g (82% yield) of Compound 7.

Step 7:

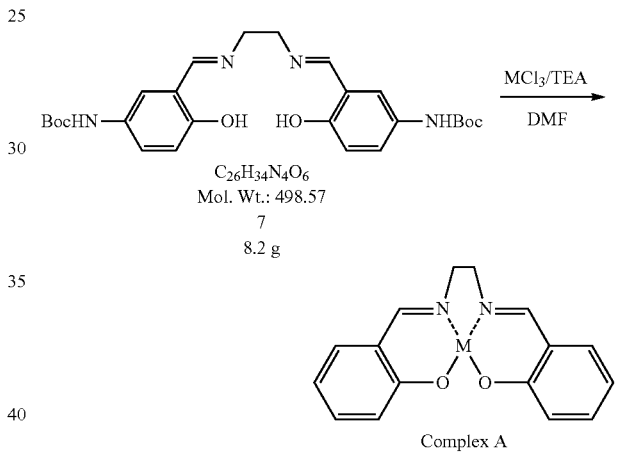

Compound 7 (8.2 g, 16 mmol) and triethylamine (22 ml, 160 mmol) were introduced into anhydrous methanol (methanol made by Showa Chemical, purity 99.5% or more) (50 ml); and a solution of $FeCl_3 \cdot 4H_2O$ (2.7 g) added in 10 ml of methanol in a case of Fe salen was mixed in a nitrogen atmosphere. The ingredients were mixed for one hour in a nitrogen atmosphere at the room temperature, thereby obtaining a brown iron-salen complex compound which was the target.

<Electric Conductivity Measurement and Dielectric Constant>

An iron-salen complex was vacuum-deposited in a thickness of 300 nm over a $SrTiO_3$(STO) substrate face (size: 10 mm×10 mm×0.5 mm, stepped surface (0001)) made by SHINKOSHA CO., LTD. Then, current-voltage characteristics of the substrate surface were measured by using a fine-structured device characteristic evaluation system N-6000 manufactured by Hitachi High-Technologies Corporation.

FIG. 2 shows SEM images at the time of measurement and FIG. 3 shows current-voltage characteristics obtained as a result of the measurement. FIG. 3 shows that the thin film made of the iron-salen complex which was vacuum-deposited on the substrate surface is almost an insulator and its electric conductivity is low. Moreover, charge-up of the thin film was observed by using a SEM. This also shows that the thin film has a low electric conductivity.

Incidentally, calculation of a bipolar moment by using DMol3 of Materials Studio ver.5.5 by Accelrys K.K. can also confirm that the iron-salen complex compound is a derivative. Specifically speaking, the results of this calculation show that the bipolar moment of the iron-salen complex represents a value three times higher than that of water molecules and the iron-salen complex thus has a high dielectric constant.

<Heat Stability Analysis (TG-Mass) of Iron-Salen Complex Compound>

Next, TG-mass analysis of the iron-salen complex compound was conducted under the following conditions.

TG Device: TG-40 by SHIMADZU CORPORATION
MS Device: GC/MS QP2010(1) by SHIMADZU CORPORATION
Measurement Conditions
Before starting measurement: after setting a sample on the TG device, feed carrier gas for 15 minutes or more and then start increasing the temperature
Heating condition: from room temperature to 500 degrees Celsius (temperature rise speed: 5 degrees Celsius/min)
Sample Weight: 3.703 mg
MS Sensitivity: 1.80 kV
Mass Number Range: m/z=10-300
Atmosphere: helium (50 ml/min)
Standard Reference Material: sodium tungstate dihydrate, 1-butene, carbon dioxide The results are shown in FIG. 4. A TGA curve indicated in FIG. 4 shows that the mass of a sample (iron-salen complex compound) relative to room temperature up to 100 degrees Celsius was 100%, 99.9% at 200 degrees Celsius, and 97.4% at 300 degrees Celsius. Consequently, it is shown that the iron-salen complex compound does not dissolve and remains stable even when heated up to a temperature of approximately 250 degrees Celsius.

EXAMPLE 2

Next, an electric double layer capacitor was produced by the same method as in Example 1, except activated carbon was used instead of the metallic film as a material for constituting the electrodes 11 and 12. Incidentally, steam activated carbon made from coconut shell carbon or resinous coal as its raw material or alkali activated carbon made from resinous coal or cokes as its raw material can be used as the activated carbon. In Example 2, alkali activated carbon which was synthesized by using phenolic resin as a precursor was used based on "Activated Carbon for High-Performance Electric Double Capacitor Electrodes," Masayuki Kouzu, Eisuke Haba, and Youichi Takei, Hitachi Chemical Technical Report No. 51 (2008-7), p.p. 13 to 16.

The electric double layer capacitor obtained in Example 2 was stable at high temperatures and its electric capacity was high like the electric double layer capacitor obtained in Example 1.

Next, electric conductivity measurement, dielectric constant, and heat stability analysis were conducted in the same manner as in Example 1 described earlier by using the following metal-salen complex compound, instead of the iron-salen complex compound, as the material for constituting the solid electrolytes 13 and 17.

Incidentally, examples of the metal-salen complex compound other than the iron-salen complex compound include a chromium-salen complex compound, a manganese-salen complex compound, a cobalt-salen complex compound, a nickel-salen complex compound, a molybdenum-salen complex compound, a rubidium-salen complex compound, an osmium-salen complex compound, an iridium-salen complex compound, a platinum-salen complex compound, a niobium-salen complex compound, a samarium-salen complex compound, an europium-salen complex compound, and a gadolinium-salen complex compound.

Consequently, the same results as those of the iron-salen complex compound were obtained. Therefore, it has been found that the electric double layer capacitor which uses the above-mentioned metal-salen complex compound as the electrode material is also stable at high temperatures and a high electric capacity can be obtained just like the electric double layer capacitor which uses the iron-salen complex compound as the electrode material.

EXAMPLE 3

First Synthesis Example

The metal-salen complex compound (II) was synthesized by the following method.

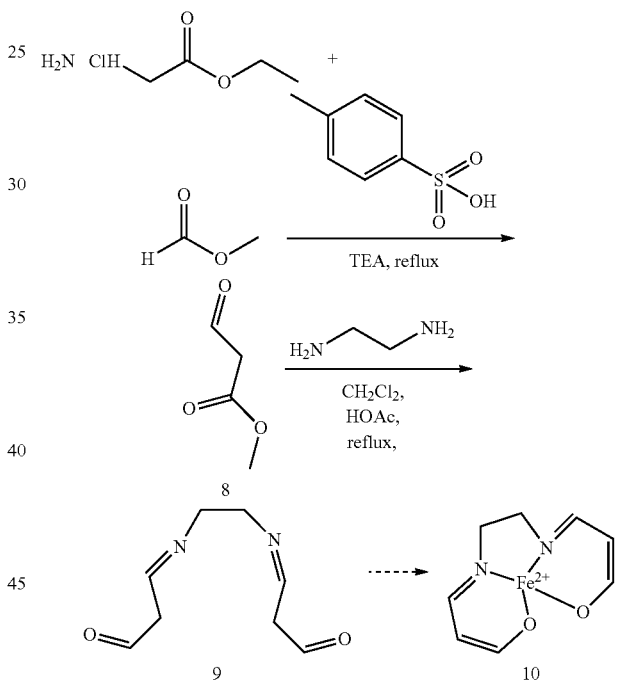

Synthesis of Compound 8:

P-toluenesulfonic acid (p-TsOH) (10 mg) was added to an ethyl formate solution (60 ml) containing glycine methyl ester monohydrochloride (10.0 g; 0.079 mol) and the obtained solution was heated to boiling. Several drops of triethylamine were put into the solution while being boiled; and the mixed solution was brought to reflux for 24 hours and then cooled down to room temperature. Subsequently, white triethylaminehydrochloride was filtered and the residue was concentrated to 20 ml. The obtained solution was cooled down to a temperature of −5 degrees Celsius and then filtered. A reddish brown concentrated solution which was a residue was obtained as Compound 8.

Synthesis of Compound 9:

After dissolving dichloromethane ($CH_2Cl_2$) (20 ml) in Compound 8, ethane-1,2-diamine (1.2 g) and acetic acid (HOAc) (20 µl) were added to the obtained solution; and this reacted mixed solution was then brought to reflux for 6 hours. Subsequently, the mixed reaction solution was cooled down to room temperature, thereby obtaining Compound 9 which was 4 g of a yellow oil concentrate. Purity of the obtained Compound 9 was enhanced by flash column chromatography by using silica gel.

Synthesis of Compound 10;

A solution of Compound 9 and triethylamine in methanol ($CH_3OH$) (50 ml) and a solution of metallic chloride ($FeCl_3$ ($4H_2O$) when synthesizing the iron-salen complex compound) in methanol ($CH_3OH$) (10 ml) were mixed (for 1 hour) in a nitrogen atmosphere, thereby obtaining a brown compound. Then, this compound was dried in a vacuum, the obtained compound was diluted with dichloromethane ($CH_2Cl_2$) (400 ml), washed twice with a saline solution, was dried over sodium sulfate ($Na_2SO_4$), and then dried in a vacuum, thereby obtaining Compound 10 (the metal-salen complex compound (II)).

Second Synthesis Example

The metal-salen complex compound (II) was synthesized by the following method.

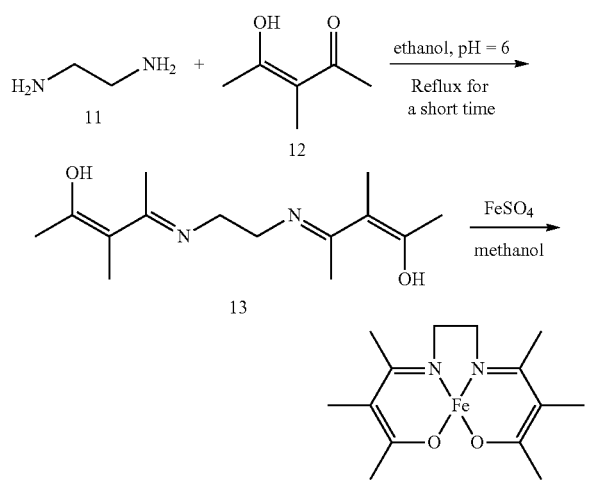

3-Methylacetylacetone (Compound 12) (3.4 g) and ethylene diamine (Compound 11) (0.9 g) were introduced into anhydrous methanol ($CH_3OH$) (50 ml) while adjusting pH to pH 6 by using acetic acid (HOAc) on ice and the obtained solution was brought to reflux for 15 minutes and allowed to evaporate until its volume reduces to one half its original volume. Then, water of the same volume was added to the solution and let it deposit, thereby obtaining 1.4 g of white Compound 13.

Subsequently, Compound 13 (1.2 g; 5 mmol) was introduced into $CH_3OH$ (50 ml) and ferrous sulfate heptahydrate ($FeSO_4.7H_2O$) (1.4 g; 5 mmol) was added to the obtained solution, thereby obtaining a pale bluish green solution. As this mixed solution was stirred for 8 hours at room temperature in a nitrogen atmosphere, its color gradually changed to brown. Subsequently, the solution was allowed to evaporate to reduce a half of its volume and then the same volume of water was added to the obtained solution. Next, vacuuming was produced to allow methanol ($CH_3OH$) to evaporate, thereby obtaining brown lumps. These lumps were gathered, washed with water, and dried by vacuuming, thereby obtaining 360 g of Compound 10 (the metal-salen complex compound (II)).

Third Synthesis Example

The metal-salen complex compound (II) was synthesized by the following method.

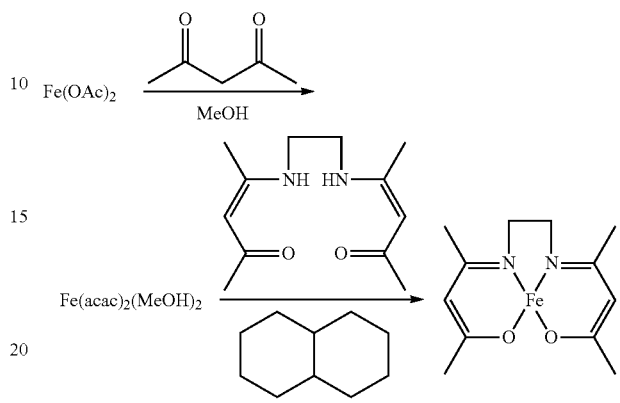

Iron (II) acetate ($Fe(CH_3CO_2)_2$) (0.83 g; 4.8 mmol) and degassed methanol ($CH_3OH$) (48 ml) were introduced into a reaction container in a nitrogen atmosphere and acetylacetone ($C_5H_8O_2$) (0.95 g; 9.5 mmol) was added to the obtained solution. The solution was stirred in a reflux for 15 minutes and then let it stand to cool, deposited crystals were filtered, and the obtained solution was washed with cooled methanol ($CH_3OH$) (10 ml). Subsequently, the solution was dried under reduced pressure, thereby obtaining 1.07 g of an intermediate.

Next, the intermediate (1.07 g; 3.4 mmol), ligand atoms (0.70 g; 3.4 mmol), and degassed decalin ($C_{10}H_{18}$) (30 ml) were introduced into a reaction container in a nitrogen atmosphere and the obtained solution was stirred in a reflux for 1 hour. Alter letting the solution stand to cool and filtering a deposited solid, the obtained solid was washed with degassed cyclohexane ($C_6H_{12}$) (10 ml). Next, the solution was dried under reduced pressure, thereby obtaining 0.17 g of a product (the metal-salen complex compound (II)).

EXAMPLE 4

The metal-salen complex compound (III) was synthesized by the following method.

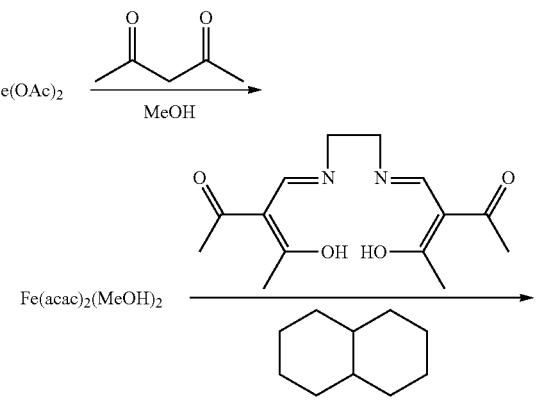

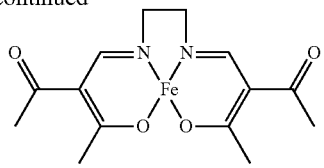

Iron (II) acetate (Fe(CH$_3$CO$_2$)$_2$) (0.78 g; 4.5 mmol) and degassed methanol (CH$_3$OH) (10 ml) were introduced into a reaction container in a nitrogen atmosphere and acetylacetone (C$_5$H$_8$O$_2$) (0.91 g) (9.9 mmol) was added to the obtained solution. The solution was stirred in a reflux for 15 minutes and then let it stand to cool, deposited crystals were filtered, and the obtained solution was washed with cooled methanol (CH$_3$OH) (10 ml). Subsequently, the solution was dried under reduced pressure, thereby obtaining 0.58 g (yield 67%) of an intermediate.

Next, the intermediate (0.24 g; 0.75 mmol), ligand atoms (0.210 g; 0.75 mmol), and degassed decalin (C$_{10}$H$_{18}$) (10 ml) were introduced into a reaction container in a nitrogen atmosphere and the obtained solution was stirred in a reflux for 30 minutes. After letting the solution stand to cool and filtering a deposited solid, the obtained solid was washed with degassed cyclohexane (C$_6$H$_{12}$) (3 ml). Next, the solution was dried under reduced pressure, thereby obtaining 0.101 g of a product (the metal-salen complex compound (III)).

EXAMPLE 5

The metal-salen complex compound (IV) was synthesized by the following method.

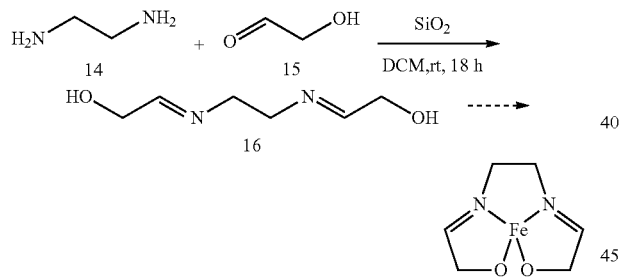

Iron (II) acetate (Fe(CH$_3$CO$_2$)$_2$) (0.83 g; 4.8 mmol) and degassed methanol (CH$_3$OH) (48 ml) were introduced into a reaction container in a nitrogen atmosphere and acetylacetone (C$_5$H$_8$O$_2$) (0.95 g; 9.5 mmol) was added to the obtained solution. The solution was stirred in a reflux for 15 minutes and then let it stand to cool. Next, Compound 15 (120 mg; 2.0 mmol) and silicon dioxide (SiO$_2$) (1 g) were added to a solution of Compound 14 (60 ml; 1.0 mmol) dissolved in dichloromethane (CH$_2$Cl$_2$) (10 ml); and the obtained solution was stirred all night at room temperature to cause a reaction, thereby synthesizing Compound 16.

Subsequently, the obtained compound together with iron (II) acetate (Fe(CH$_3$CO$_2$)$_2$) (0.83 g) (4.8 mmol), and degassed methanol (CH$_3$OH) (48 ml) was introduced into a reaction container in a nitrogen atmosphere and acetylacetone (C$_5$H$_8$O$_2$) (0.95 g; 9.5 mmol) was added to the obtained solution. The solution was stirred for 15 minutes in a reflux and deposited crystals were filtered, thereby obtaining the metal-salen complex compound (IV)) which was a brown compound.

EXAMPLE 6

The metal-salen complex compounds (V) to (XI) were synthesized by a method described on pages 43 to 47 of a specification of WO2010/058280. Bromine or a methoxyl group, which is a side chain, is added to a main skeleton, when forming a metal complex bond to salen, by substituting a protecting group (NHBoc), which is bonded to a benzene ring at a para position with an OH group of the benzene ring, with bromine or the methoxyl group. If Formula (I) is the compounds (VIII) and (IX), (c, d) and (e, f) of Formula (I) constitute anthracene; and with these compounds (VIII) and (IX), the following compound is used as a starting material instead of para-nitrophenol.

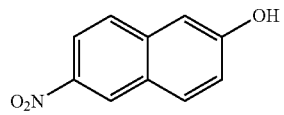 [SMILES: O=[N+]([O-])c1ccc2cc(O)ccc2c1]

Furthermore, if Formula (I) is the compound (VI), (a, h) of Formula (I) constitute cyclohexane. Also, if Formula (I) is the compound (VII), (a, h) of Formula (I) constitute benzene. Regarding synthesis of these compounds (VI) and (VII), the target salen before forming a coordinate bond with a metal is produced by a method described in Journal of Thermal Analysis and calorimetry, Vol. 75 (2004) 599-606, Experimental on page 600.

EXAMPLE 7

Next, an electric double layer capacitor element was prepared under conditions described below and the appearance of the obtained electric double layer capacitor element, an electrostatic capacity, and a relative dielectric constant were evaluated.

<Specification and Preparation Conditions for Electric Double Layer Capacitor Element>
  Washing Process
    Target To Be Washed: no-alkali glass substrate, sealing glass cap
    Washing Environment: clean booth (class 100) in clean room (class 1,000)
    Agents: organic solvent (EL: standard product), organic alkali solution (EL: standard product), ultrapure water (18 MO, TOC: 10 ppb or lower)
    Equipment: supersonic washer (40 kHz and 950 kHz), UV ozone washer, vacuum desiccator
    Execution Steps: wet washing (ultrapure water, organic alkali, organic solvent+ultrasonic wave), then drying (vacuum degassing), and then dry washing (UV Ozone)
  Vapor Deposition Process (common to each vapor-deposited layer)
    Degree of Vacuum: $1 \times 10^{-4}$ to $2 \times 10^{-4}$ Pa
    Vapor Deposition Speed: 1 to 2 Å/s
    Element Structure: No-alkali glass/Ti (10 nm)/Au electrode (50 nm)/iron-salen complex compound (50 to 400 nm)/Au electrode (50 nm)
    Element Area: $2.0 \times 2.0$ mm$^2$
    Number of Prepared Elements: 6 electric double layer capacitor elements in total, that is 3 substrates for each element type which has the above-described element structure and whose iron-salen complex compound film thickness is 200 nm or 400 nm, were prepared.

Sealing Specification

Sealing Environment: within glove box ($H_2O$ and $O_2$, 10 ppm or lower)

Curing Conditions: the element and a sealing can made of glass were bonded together and the bonded element was took out of the glove box, irradiated with UV, and stored in a thermostatic bath as heat treatment at a temperature of 80 degrees Celsius for 3 hours.

Getter: 10-mm square manufactured by DYNIC CORPORATION

Sealing Agent: UV curable epoxy resin produced by ThreeBond Co., Ltd.

<Evaluation>

(Appearance of Electric Double Layer Capacitor Element)

Figure 5:
FIG. 5(1) is a photograph showing a substrate face of an electric double layer capacitor element whose iron-salen complex compound film thickness is 400 nm.
Figure 5:
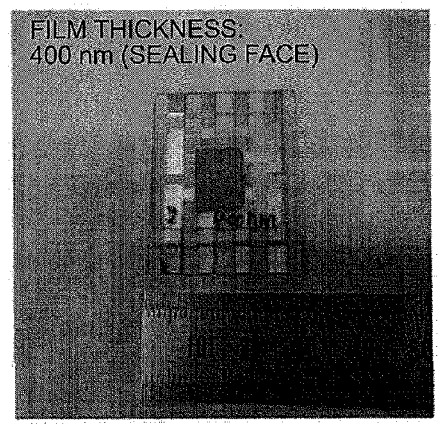

FIG. 5(1) is a photograph showing a substrate face of an electric double layer capacitor element whose iron-salen complex compound film thickness is 400 nm; and FIG. 5(2) is a photograph showing a sealing face of the electric double layer capacitor element shown in FIG. 5(1). Referring to FIG. 5, four lines extending vertically on the substrate are lower Au electrodes and lines placed perpendicularly to those lower Au electrodes are upper Au electrodes. A film of an iron-salen complex compound is formed in a 13-mm central substrate opening area between both the AU electrodes. Incidentally, the appearance of an electric double layer capacitor element whose iron-salen complex compound film thickness is 200 nm is the same as that shown in FIG. 5.

(Measurement of Electrostatic Capacity and Relative Dielectric Constant)

One of the electric double layer capacitor elements whose iron-salen complex compound film thicknesses are 200 nm or 400 nm (3 elements for each type) was used to conduct preliminary measurement (to check whether the measurement is possible or not, and check how numerical measured values are scattered) and the remaining two elements were used to conduct actual measurement. The measurement was conducted at two positions on the electric double layer capacitor element of each film thickness. Incidentally, the measurement was conducted by using two devices manufactured by different manufacturers in order to avoid device dependency of the measured values, which is rarely observed in, for example, organic semiconductors. The measurement results are shown in Table 1.

Incidentally, the relative dielectric constant was converted by using the following constant.

Vacuum Dielectric Constant: $8.54 \times 10^{-12}$ (F/m)

Device Area: 2 mm×2 mm

According to the results shown in Table 1, it was confirmed that the iron-salen complex compound could function as a derivative for the capacitor element. Furthermore, the results show that the element whose iron-salen complex compound film thickness is 200 nm has an electrostatic capacity of approximately 1.4 nF and its relative dielectric constant (1 kHz) is approximately 7 to 8, which is a high value among organic substances. For example, since the relative dielectric constant of, for example, PET or PEN which is used for a film capacitor is approximately 3, you can tell that the above-mentioned relative dielectric constant is a relatively high value.

REFERENCE SIGNS LIST 1 electric double layer capacitor
11, 12 electrodes (collectors)
13, 17 solid electrolytes
15, 16 gaskets
18 separator

The invention claimed is:

1. An electric double layer capacitor material composed of a metal-salen complex compound used as a material for forming a solid electrolyte for an electric double layer capacitor, wherein the metal-salen complex compound is expressed by Formula (XII) below,

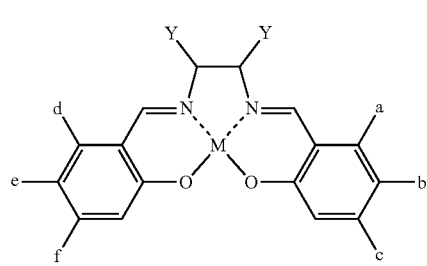

Formula (XII)

TABLE 1

| | | Thickness | | | | | | | |
|---|---|---|---|---|---|---|---|---|---|
| | | 200 nm | | | | 400 nm | | | |
| | | Frequency (Hz) | | | | | | | |
| | | 120 | 1k | 10k | 100k | 120 | 1k | 10k | 100k |
| First Measurement Results | | | | | | | | | |
| Measuring Device: NF Circuit Block LCZ Meter 2330 | | | | | | | | | |
| Electrostatic Capacity (nF) | Average Value | 1.476 | 1.285 | 1.216 | 1.184 | 0.675 | 0.663 | 0.654 | 0.646 |
| | Standard Deviation | 0.018 | 0.013 | 0.011 | 0.010 | 0.010 | 0.009 | 0.009 | 0.009 |
| RelativeDielectric Constant | Average Value | 8.34 | 7.26 | 6.87 | 6.69 | 7.62 | 7.49 | 7.39 | 7.29 |
| | Standard Deviation | 0.10 | 0.07 | 0.06 | 0.06 | 0.12 | 0.11 | 0.10 | 0.10 |
| Second Measurement Results | | | | | | | | | |
| Measuring Device: HIOKI LRC High Tester 3532-50 | | | | | | | | | |
| Electrostatic Capacity (nF) | Average Value | 1.370 | 1.220 | 1.155 | 1.123 | 0.730 | 0.712 | 0.703 | 0.695 |
| | Standard Deviation | 0.037 | 0.034 | 0.030 | 0.027 | 0.002 | 0.006 | 0.006 | 0.005 |
| RelativeDielectric Constant | Average Value | 7.74 | 6.89 | 6.53 | 6.34 | 8.24 | 8.04 | 7.94 | 7.85 |
| | Standard Deviation | 0.21 | 0.19 | 0.17 | 0.15 | 0.02 | 0.07 | 0.07 | 0.06 | wherein M represents Fe, Cr, Mn, Co, Ni, Mo, Ru, Rh, Pd, W, Re, Os, Ir, Pt, Nd, Sm, Eu, or Gd and each of a to f and Y is hydrogen.

2. An electric double layer capacitor material composed of a metal-salen complex compound used as a material for forming a solid electrolyte for an electric double layer capacitor, wherein the metal-salen complex compound is expressed by Formula (XIII) below,

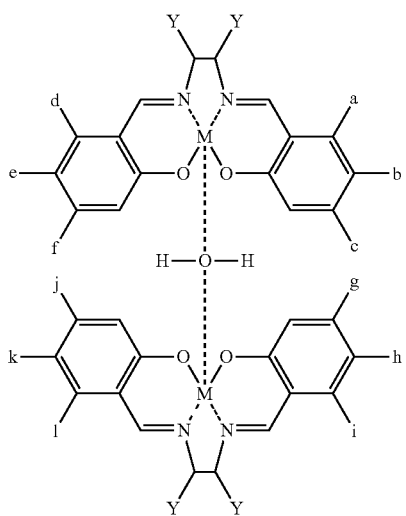

Formula (XIII)

wherein M represents Fe, Cr, Mn, Co, Ni, Mo, Ru, Rh, Pd, W, Re, Os, Ir, Pt, Nd, Sm, Eu, or Gd and each of a to f and Y is hydrogen.

3. An electric double layer capacitor material composed of a metal-salen complex compound used as a material for forming a solid electrolyte for an electric double layer capacitor, wherein the metal-salen complex compound is expressed by Formula (XIV) below,

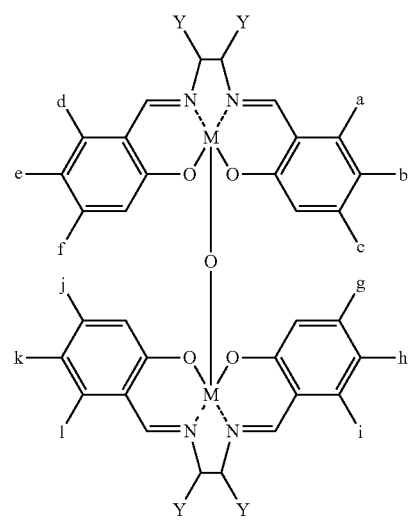

Formula (XIV)

wherein M represents Fe, Cr, Mn, Co, Ni, Mo, Ru, Rh, Pd, W, Re, Os, Ir, Pt, Nd, Sm, Eu, or Gd and each of a to f and Y is hydrogen.

* * * * *